United States Patent
Wu et al.

(10) Patent No.: US 7,807,301 B2
(45) Date of Patent: Oct. 5, 2010

(54) LITHIUM BATTERY

(75) Inventors: Hung-Chun Wu, Jhubei (TW); Fu-Ming Wang, Sijhih (TW); Ching-Yi Su, Yongkang (TW); Chang-Rung Yang, Taiping (TW); Jing-Pin Pan, Chutung Chen (TW); Yu-Chan Yen, Taipei (TW); Nae-Lih Wu, Taipei (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 12/344,074

(22) Filed: Dec. 24, 2008

(65) Prior Publication Data

US 2009/0311611 A1    Dec. 17, 2009

(30) Foreign Application Priority Data

Jun. 17, 2008    (TW) .............................. 97122518 A

(51) Int. Cl.
H01M 10/40    (2006.01)
(52) U.S. Cl. ....................................... 429/338; 429/328
(58) Field of Classification Search ................. 429/326, 429/328, 338, 342, 199, 343, 200
See application file for complete search history.

(56) References Cited

U.S. PATENT DOCUMENTS 6,541,156 B1 *   4/2003   Fuse et al. ............... 429/218.1
2006/0292450 A1 *   12/2006   Nakanishi et al. ........... 429/326
2008/0160418 A1 *   7/2008   Pan et al. .................... 429/328
2009/0142627 A1 *   6/2009   Shimomura et al. ............ 429/2

FOREIGN PATENT DOCUMENTS

JP    2001-114834    *   4/2001
JP    2004-185984        7/2004

* cited by examiner

*Primary Examiner*—Jennifer Michener
*Assistant Examiner*—Monique Wills
(74) *Attorney, Agent, or Firm*—Lowe Hauptman Ham & Berner, LLP

(57) ABSTRACT

Disclosed is a lithium battery including a silicon negative electrode, a lithium mixed metal oxide positive electrode, a separator disposed between the negative and positive electrodes to define a reservoir region, an electrolytic solution filled in the reservoir region, and a sealant structure wrapped around the silicon negative electrode, the lithium mixed metal oxide positive electrode, the separator, and the electrolytic solution. The electrolytic solution includes an organic solvent, a lithium salt, and an additive. The additive includes a maleimide compound and vinylene carbonate. The silicon negative electrode of the lithium battery employing the described electrolytic solution has higher cycle efficiency and longer operating lifespan.

9 Claims, 1 Drawing Sheet

LITHIUM BATTERY

CROSS REFERENCE TO RELATED APPLICATIONS

This Application claims priority of Taiwan Patent Application No. 97122518, filed on Jun. 17, 2008, the entirety of which is incorporated by reference herein.

BACKGROUND OF THE INVENTION

1. Field of the Invention

The present invention relates to lithium batteries, and in particular relates to a lithium battery with a silicon negative electrode and an electrolytic solution thereof.

2. Description of the Related Art

A lot of research regarding batteries as a driving energy source has been conducted to minimize battery weight for, and meet sophisticated technological requirements of, portable electronic devices such as video cameras, cellular phones and laptop computers. Particularly, the rechargeable lithium batteries have more energy density per unit weight then conventional lead storage batteries, nickel-cadmium batteries, nickel-hydro batteries and nickel-zinc batteries. In addition, they can be quick recharged.

Electrolytes of the lithium battery are categorized as liquid or solid electrolytes, according to the electrolytic type. However, the liquid type electrolyte often raises many safety problem issues including the potential danger for fire due to leakage, and outflow and destruction of batteries from evaporation. Hence, many researchers have suggested using solid electrolytes instead.

Many studies have particularly focused on solid polymer electrolytes, because solid polymer electrolytes are unlikely to leak electrolytic solution, and they are easy to process. Solid polymer electrolytes are further categorized into full solid types and gel types, wherein the full solid types do not contain an organic electrolytic solution, while the gel types do.

Generally, conventional aqueous electrolytic solutions are not suitable for lithium batteries mainly because they may react violently with lithium, which is used as an anode. Thus, an organic electrolytic solution in which a lithium salt is dissolved is used instead. The organic solvent may have high ionic conductivity, a high dielectric constant and low viscosity. But it is very difficult to obtain a single organic solvent having all three of these characteristics. As a result, a mixed solvent composed of an organic solvent having a high dielectric constant and an organic solvent having a low dielectric constant, or a mixed solvent composed of an organic solvent having a high dielectric constant and an organic solvent having low viscosity, is used as is an organic solvent for lithium batteries.

A lithium battery positive electrode is typically composed of an active material including transition metal compounds such as $LiNiO_2$, $LiCoO_2$, $LiMn_2O_4$, $LiFePO_4$, $LiNi_xCo_{1-x}O_2$, $Ni_{1-x-y}Co_xMn_yO_2$, or oxides containing the transition metal compounds and lithium. A lithium battery negative electrode is typically composed of an active material including lithium metal, a lithium metal alloy or a carbonaceous material, and a graphite material. However, the electric capacities of the described negative electrode materials are lower than that of the silicon negative electrode material, wherein electric capacity may reach 4,684 mAh/cc. The silicon source can be inexpensive quartz sand without doubt of environment pollution, and be an ultimate negative electrode material. Although the silicon material is advantageous compared to conventional negative electrode materials, several fabrication technique difficulties exists. First, the lithium ions of the electrolytic solution and the silicon negative electrode will alloy and de-alloy during charging and discharging, respectively. The re-crystallized silicon forms particles which are further ablated from the negative electrodes. Second, the volume of the negative electrode dramatically changes, up to over 200%, during alloying and de-alloying, such that the electrode structure peels due to relaxing of the adhesive agent of the electrode. Third, the silicon electrode alloys at a first charge/discharge and the re-crystallized silicon surface and the electrolyte reacts to form an SEI film, thereby resulting in irreversible electric capacity loss that is too high.

The principal methods for improving the charge/discharge efficiency of the silicon negative electrode are to change the electrode composition. In JP Pub. No. 2004-185984, the amorphous silicon content ratio in silicon negative electrode is enhanced. In U.S. Pat. No. 6,541,156, the silicon powder for manufacturing the silicon negative electrode is covered by carbon film.

Accordingly, a method for further improving the charge/discharge efficiency of the silicon negative electrode of the lithium battery is called for.

BRIEF SUMMARY OF THE INVENTION

The invention provides a lithium battery, comprising: a silicon negative electrode; a lithium mixed metal oxide positive electrode; a separator disposed between the silicon negative electrode and the lithium mixed metal oxide positive electrode to define a reservoir region; an electrolytic solution filled in the reservoir region; and a sealant structure wrapped around the silicon negative electrode, the lithium mixed metal oxide positive electrode, the separator, and the electrolytic solution, wherein the electrolytic solution comprises: an organic solvent; a lithium salt; and an additive comprising a maleimide, a bismaleimide, a polymaleimide, a polybismaleimide, a copolymer of maleimide and bismaleimide, or mixtures thereof, and vinylene carbonate.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
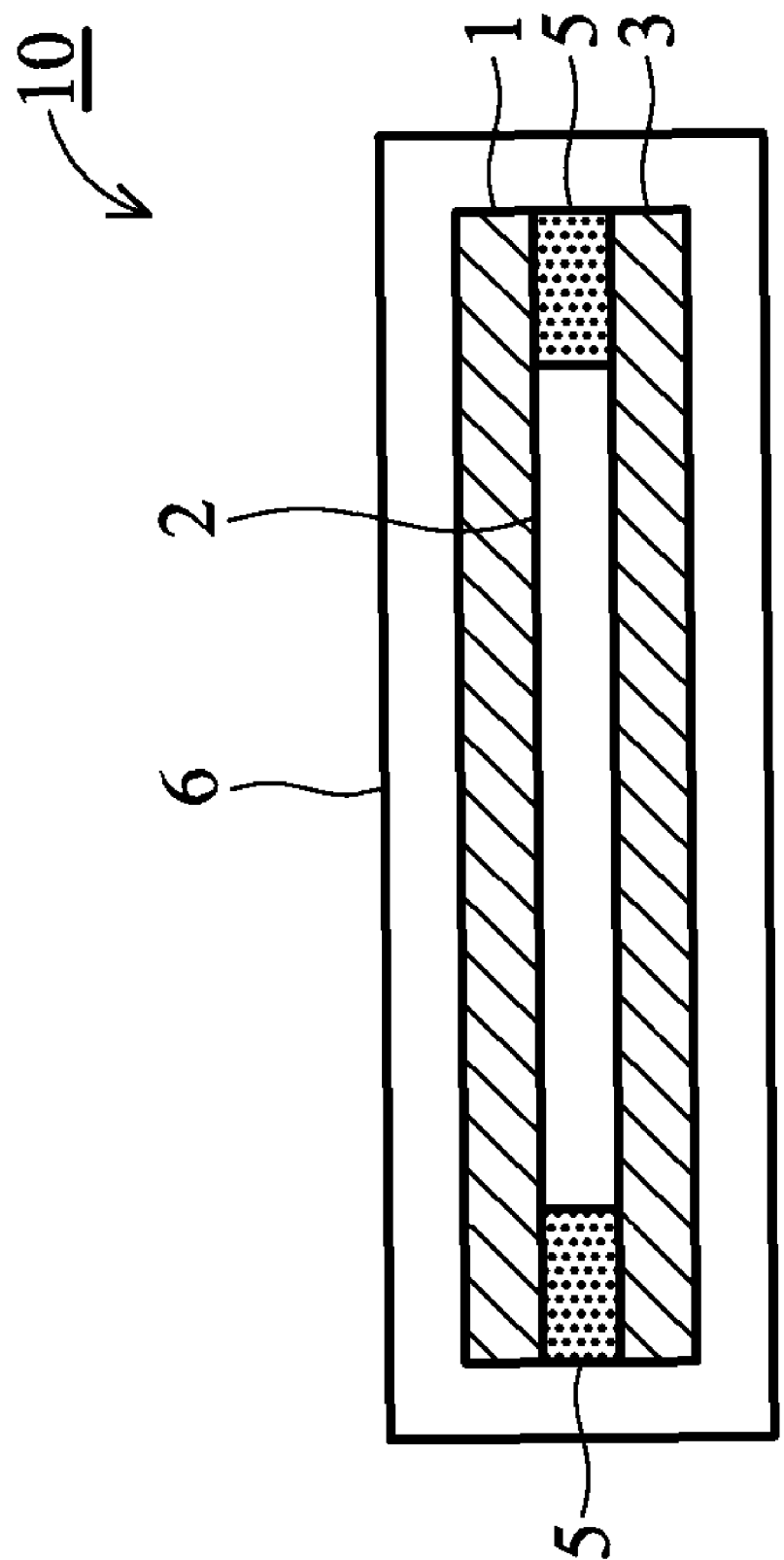
FIG. 1 is cross section of a lithium battery in one embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

FIG. 1 is cross section of a lithium battery 10 in one embodiment of the invention. In FIG. 1, a separator film 5 is disposed between a silicon negative electrode 1 and a lithium mixed metal oxide positive electrode 3 to define a reservoir region 2. An electrolytic solution is filled in the reservoir region 2, and a sealant structure 6 is wrapped around the silicon negative electrode 1, the lithium mixed metal oxide positive electrode 3, the separator film 5, and the electrolytic solution in the reservoir region 2.

The silicon negative electrode 1 is formed by ball-grinded commercial available silicon powder. For improving the conductivity of the silicon material and preventing the irreversible electric capacity loss due to the reaction of the electrolyte and the silicon electrode surface, the silicon powder surface can be covered by a carbon film by a general chemical vapor deposition (CVD) process. The carbon film and the silicon powder have a weight ratio of 5 wt % to 50 wt %. If the carbon film weight ratio is less than 5 wt %, the electrode conductivity will be not enough. If the carbon film weight ratio is higher than 50 wt %, it will be difficult for the lithium ions to reach the silicon surface through the carbon film.

The lithium mixed metal oxide positive electrode 3 can be $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$, or combinations thereof, wherein $0<x<1$ and Mc is a divalent metal.

The lithium mixed metal oxide positive electrode 3 may further include a polymer binder to increase the electrode mechanism strength. A suitable polymer binder can be polyvinylidene fluoride (PVDF), styrene-butadiene rubber (SBR), polyamide, melamine resin, or combinations thereof.

The separator film 5 is an insulator material such as polyethylene (PE), polypropylene (PP), or a multi-layered structure thereof (e.g. PE/PP/PE).

The electrolytic solution comprises an organic solvent, a lithium salt, and an additive. The organic solvent can be γ-butyrolactone (GBL), ethylene carbonate (EC), propylene carbonate (PC), diethyl carbonate (DEC), propyl acetate (PA), dimethyl carbonate (DMC), ethylmethyl carbonate (EMC), or combinations thereof. The lithium salt includes $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, or combinations thereof.

The additive of the electrolytic solution is utilized to reduce the electric capacity loss of the silicon negative electrode 1 during charge/discharge. The invention utilizes maleimide series compound collocated with conventional vinylene carbonate (VC) as the additive of the electrolytic solution. The maleimide series compound can be maleimide, bismaleimide, a polymaleimide, a polybismaleimide, a copolymer of maleimide and bismaleimide, or mixtures thereof.

The maleimide includes N-phenylmaleimide, N-(o-methylphenyl)maleimide, N-(m-methylphenyl)maleimide, N-(p-methylphenyl)maleimide, N-cyclohexylmaleimide, maleimide, maleimidophenol, maleimidobenzocyclobutene, phosphorous-containing maleimide, phosphonate-containing maleimide, siloxane-containing maleimide, N-(4-tetrahydropyranyl-oxyphenyl)maleimide, or 2,6-xylylmaleimide. In addition, the double bond of the maleimide can be polymerized by an initiator barbituric acid (BTA) to form polymaleimide. In one embodiment, the polymaleimide has a molecular weight of 300 to 30000.

The bismaleimide is represented as Formula 1:

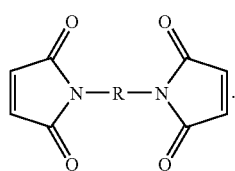
(Formula 1)

In Formula 1, R includes

—$(CH_2)_2$—, —$(CH_2)_6$—, —$(CH_2)_8$—,

-continued

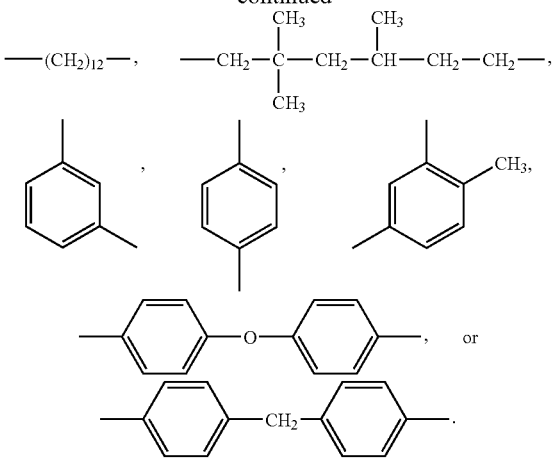

, or

Similar to the maleimide, the double bond of the bismaleimide can be polymerized by an initiator barbituric acid (BTA) to form polybismaleimide. In one embodiment, the polybismaleimide has a molecular weight of 300 to 30000. In another embodiment, the maleimide and the bismaleimide can be copolymerized by an initiator BTA to form a copolymer of maleimide and bismaleimide, wherein the copolymer has a molecular weight of 300 to 30000.

In one embodiment, the electrolytic solution has 98.9 to 85 parts by weight of the organic solvent, 1 to 10 parts by weight of the lithium salt, and 0.1 to 5 parts by weight of the additive. In the additive, the maleimide series compound and the VC have a weight ratio of 1:1 to 1:5. In the invention, the maleimide series compound and the VC are coupled to form a preset SEI film on the silicon negative electrode, such that the decomposition of the electrolytic solution on the silicon negative electrode surface can be slowed down. As such, the electric capacity of the silicon negative electrode 1 is enhanced during charge/discharge, and the irreversible electric capacity loss of charge/discharge circle is reduced.

EXAMPLES

Preparation of the Silicon Negative Electrode

Silicon powder (commercially available from Aldrich, 99%, 325 mesh) was ball-grinded to reach an average diameter of 3 μm. Graphite KS6 (commercially available from Timcal) and carbon black super P (commercially available from Timcal) served as a conductivity assistant, and styrene butadiene rubber L1571 (commercially available from Asahi Chemicals.) and carboxyl methyl cellulose WS-C (commercially available from DKS International, Inc.) served as a binder, and the described ball-grinded silicon powder were molded to prepare a silicon electrode. The silicon electrode can be served as a negative electrode assembled in a button cell battery.

In one embodiment, the silicon powder surface was covered by a carbon film by a CVD process. The carbon film weight ratio means the weight ratio between the carbon and the material. For example, if the silicon powder is 70 g before the CVD process and is 100 g after the CVD process, the carbon film is 30 g and occupies 30 wt % of the material. Similar to pure silicon powder, the silicon powder surface covered by the carbon film may collocate with the described conductivity assistant and binder to prepare a silicon electrode, and the silicon electrode can be served as a negative electrode assembled in a button cell battery.

Example 1

2 parts by volume of EMC and 1 part by weight of EC were taken as the organic solvent of the electrolytic solution. The lithium salt, LiPF$_6$, of the electric solution had a concentration of 1M.

The silicon electrode was set in the electrolytic solution to conduct a charge/discharge experiment. During the charge/discharge process, the forward/reverse current was 0.3 mA/mg and the voltage was 0.01V to 1.2V (voltage v.s. Li/Li$^+$). The first charge/discharge data was tabulated as shown in Table 1.

Example 2

2 parts by volume of EMC and 1 part by weight of EC were taken as the organic solvent of the electrolytic solution. The lithium salt, LiPF$_6$, of the electric solution had a concentration of 1M. The additive of the electric solution was bismaleimide as shown in Formula 2, and the additive amount occupied 0.5 wt % of the electrolytic solution.

The silicon electrode was set in the electrolytic solution to conduct a charge/discharge experiment. The forward/reverse current and the voltage of the charge/discharge were similar to that of Example 1. The first charge/discharge data was tabulated as shown in Table 1.

Example 3

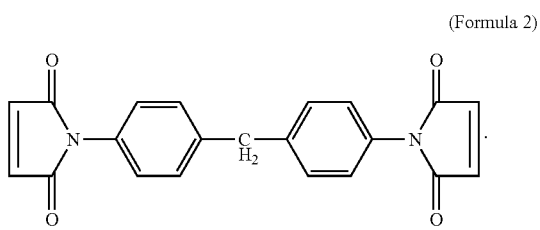

(Formula 2)

2 parts by volume of EMC and 1 part by weight of EC were taken as the organic solvent of the electrolytic solution. The lithium salt, LiPF$_6$, of the electric solution had a concentration of 1M. The additive of the electric solution was polybismaleimide, and the additive amount occupied 0.5 wt % of the electrolytic solution. The polybismaleimide was polymerized by the bismaleimide shown in Formula 2, and its molecular weight ranged from 300 to 30000.

The silicon electrode was set in the electrolytic solution to conduct a charge/discharge experiment. The forward/reverse current and the voltage of the charge/discharge were similar to that of Example 1. The first charge/discharge data was tabulated as shown in Table 1.

Example 4

2 parts by volume of EMC and 1 part by weight of EC were taken as the organic solvent of the electrolytic solution. The lithium salt, LiPF$_6$, of the electric solution had a concentration of 1M. The additive of the electric solution was vinylene carbonate, and the additive amount occupied 2 wt % of the electrolytic solution.

The silicon electrode was set in the electrolytic solution to conduct a charge/discharge experiment. The forward/reverse current and the voltage of the charge/discharge were similar to that of Example 1. The first charge/discharge data was tabulated as shown in Table 1.

Example 5

2 parts by volume of EMC and 1 part by weight of EC were taken as the organic solvent of the electrolytic solution. The lithium salt, LiPF$_6$, of the electric solution had a concentration of 1M. The additive of the electric solution was bismaleimide as shown in Formula 2 and the vinylene carbonate, and the additive amount of the bismaleimide and the vinylene carbonate occupied 0.5 wt % and 2 wt % of the electrolytic solution, respectively.

The silicon electrode was set in the electrolytic solution to conduct a charge/discharge experiment. The forward/reverse current and the voltage of the charge/discharge were similar to that of Example 1. The first charge/discharge data was tabulated as shown in Table 1.

TABLE 1

| | Electrode material | Additive of the electrolytic solution | Charge capacity (mAh/g) | Discharge capacity (mAh/g) | Charge/discharge efficiency (%) |
|---|---|---|---|---|---|
| Example 1 | Si | None | 2047 | 477 | 23.3 |
| Example 2 | Si | 0.5 wt % BMI | 3718 | 1797 | 48.3 |
| Example 3 | Si | 0.5 wt % PBMI | 3085 | 1775 | 57.5 |
| Example 4 | Si | 2 wt % VC | 3326 | 1021 | 30.7 |
| Example 5 | Si | 2 wt % VC + 0.5 wt % BMI | 3326 | 1649 | 49.6 |

As shown in Table 1, the silicon electrodes in the electrolytic solution including bismaleimide (Example 2) or polybismaleimide (Example 3) have higher charge/discharge efficiency than the silicon electrode in the electrolytic solution without any additive (Example 1). In addition, the silicon electrodes in the electrolytic solutions including the single additive such as bismaleimide (Example 2) or vinylene carbonate (Example 4) have lower charge/discharge efficiency than the silicon electrode in the electrolytic solution including both additives (Example 5).

Example 6

2 parts by volume of EMC and 1 part by weight of EC were taken as the organic solvent of the electrolytic solution. The lithium salt, LiPF$_6$, of the electric solution had a concentration of 1M.

The silicon electrode prepared from the silicon powder covered by 30 wt % carbon film was set in the electrolytic solution to conduct a charge/discharge experiment. During the charge/discharge process, the forward/reverse current was 0.3 mA/mg and the voltage was 0.01V to 1.2V (voltage v.s. Li/Li$^+$). The first charge/discharge data was tabulated as shown in Table 2.

Example 7

2 parts by volume of EMC and 1 part by weight of EC were taken as the organic solvent of the electrolytic solution. The lithium salt, LiPF$_6$, of the electric solution had a concentration of 1M. The additive of the electric solution was vinylene carbonate, and the additive amount occupied 2 wt % of the electrolytic solution.

The silicon electrode prepared from the silicon powder covered by 30 wt % carbon film was set in the electrolytic solution to conduct a charge/discharge experiment. The forward/reverse current and the voltage of the charge/discharge were similar to that of Example 6. The first charge/discharge data was tabulated as shown in Table 2.

Example 8

2 parts by volume of EMC and 1 part by weight of EC were taken as the organic solvent of the electrolytic solution. The lithium salt, $LiPF_6$, of the electric solution had a concentration of 1M. The additive of the electric solution was bismaleimide as shown in Formula 2 and the vinylene carbonate, and the additive amount of the bismaleimide and the vinylene carbonate occupied 0.5 wt % and 2 wt % of the electrolytic solution, respectively.

The silicon electrode prepared from the silicon powder covered by 30 wt % carbon film was set in the electrolytic solution to conduct a charge/discharge experiment. The forward/reverse current and the voltage of the charge/discharge were similar to that of Example 6. The first charge/discharge data was tabulated as shown in Table 2.

lithium salt, $LiPF_6$, of the electric solution had a concentration of 1M. The additive of the electric solution was vinylene carbonate, and the additive amount occupied 2 wt % of the electrolytic solution.

The silicon electrode prepared from the silicon powder covered by 15 wt % carbon film was set in the electrolytic solution to conduct a charge/discharge experiment. During the charge/discharge process, the forward/reverse current was 0.3 mA/mg and the voltage was 0.01V 1.2V (voltage v.s. $Li/Li^+$). The first and second charge/discharge data was tabulated as shown in Table 3.

Example 10

2 parts by volume of EMC and 1 part by weight of EC were taken as the organic solvent of the electrolytic solution. The lithium salt, $LiPF_6$, of the electric solution had a concentration of 1M. The additive of the electric solution was polybismaleimide and the vinylene carbonate, and the additive amount of the polybismaleimide and the vinylene carbonate occupied 0.5 wt % and 2 wt % of the electrolytic solution, respectively. The polybismaleimide was polymerized by the

TABLE 2

| | Electrode material | Additive of the electrolytic solution | Charge capacity (mAh/g) | Discharge capacity (mAh/g) | Charge/discharge efficiency (%) |
|---|---|---|---|---|---|
| Example 6 | Si—30 wt % C | None | 2366 | 2045 | 86.4 |
| Example 7 | Si—30 wt % C | 2 wt % VC | 2152 | 1912 | 88.8 |
| Example 8 | Si—30 wt % C | 2 wt % VC + 0.5 wt % BMI | 2116 | 2020 | 95.5 |

As shown in Table 2, the silicon electrode made from silicon powder covered by carbon film had higher charge/discharge efficiency than the silicon electrode made from pure silicon. The silicon without carbon film will alloy/de-alloy during charge/discharge, and this phenomenon can be prevented by the carbon film as Example 6. Comparing Examples 7 and 8, the charge/discharge efficiency was slightly improved by the single additive vinylene carbonate, but the efficiency was largely improved from 88.8% to 95.5%, about 10%, by both additives of VC and BMI.

Example 9

2 parts by volume of EMC and 1 part by weight of EC were taken as the organic solvent of the electrolytic solution. The bismaleimide shown in Formula 2, and its molecular weight ranged from 300 to 30000.

The silicon electrode prepared from the silicon powder covered by 15 wt % carbon film was set in the electrolytic solution to conduct a charge/discharge experiment. The forward/reverse current and the voltage of the charge/discharge were similar to that of Example 9. The first and second charge/discharge data was tabulated as shown in Table 3.

TABLE 3

| | Electrode material | Additive of the electrolytic solution | $1^{st}$ charge capacity (mAh/g) | $1^{st}$ discharge capacity (mAh/g) | $1^{st}$ charge/discharge efficiency | $2^{nd}$ charge capacity (mAh/g) | $2^{nd}$ discharge capacity (mAh/g) | $2^{nd}$ charge/discharge efficiency |
|---|---|---|---|---|---|---|---|---|
| Example 9 | Si—15 wt % C | 2 wt % VC | 2827 | 2531 | 89.5% | 2555 | 2283 | 89.3% |
| Example 10 | Si—15 wt % C | 2 wt % VC + 0.5 wt % PBMI | 2405 | 2141 | 89.0% | 2106 | 1986 | 94.3% |

As shown in Table 3, although the Example 9 with the single additive vinylene carbonate had higher first charge/discharge efficiency, the Example 10 with both additives polybismaleimide and vinylene carbonate had higher second charge/discharge efficiency. If the charge/discharge circles increased, it is reasonable to presume that the silicon electrode in the electrolytic solution with both additives (Example

What is claimed is:

1. A lithium battery, comprising:
   a silicon negative electrode;
   a lithium mixed metal oxide positive electrode;
   a separator disposed between the silicon negative electrode and the lithium mixed metal oxide positive electrode to define a reservoir region;
   an electrolytic solution filled in the reservoir region; and
   a sealant structure wrapped around the silicon negative electrode, the lithium mixed metal oxide positive electrode, the separator, and the electrolytic solution,
   wherein the electrolytic solution comprises:
      an organic solvent;
      a lithium salt; and
      an additive comprising:
         maleimide, bismaleimide, a polymaleimide, a polybismaleimide, a copolymer of maleimide and bismaleimide, or mixtures thereof, and
      vinylene carbonate;
         wherein the maleimide is, N-(o-methylphenyl) maleimide, N-(m-methylphenyl) maleimide, N-(p-methylphenyl) maleimide, N-cyclohexylmaleimide, maleimidophenol, maleimidobenzocyclobutene, phosphorus-containing maleimide, phosphonate-containing maleimide, siloxane-containing maleimide, N-(4-tetrahydropyranyl-oxyphenyl) maleimide, or 2,6-xylylmaleimide.

2. The lithium battery as claimed in claim 1, wherein the organic solvent comprises: γ-butyrolactone, ethylene carbonate, propylene carbonate, diethyl carbonate, propyl acetate, dimethyl carbonate, ethylmethyl carbonate, or combinations thereof.

3. The lithium battery as claimed in claim 1, wherein the lithium salt comprises: $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, or combinations thereof.

4. The lithium battery as claimed in claim 1, wherein the bismaleimide is represented by formula as below:

wherein R comprises

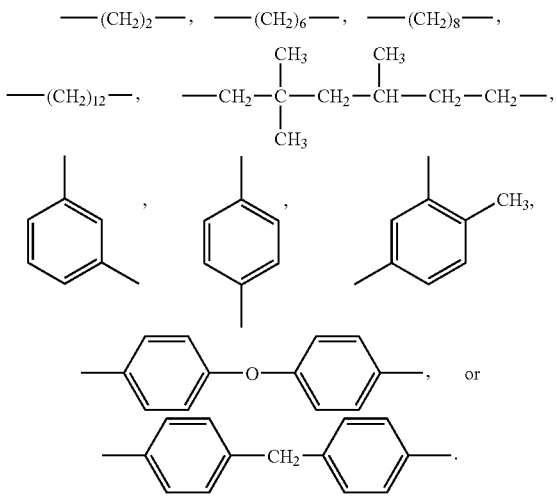

5. The lithium battery as claimed in claim 1, wherein the silicon negative electrode is composed of a silicon powder, and the surface of the silicon powder is further covered by a carbon film.

6. The lithium battery as claimed in claim 5, wherein the carbon film to the silicon powder has a weight ratio of 10 wt % to 50 wt %.

7. The lithium battery as claimed in claim 1, wherein the lithium mixed metal oxide positive electrode comprises: $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$, or combinations thereof, wherein $0<x<1$ and Mc is a divalent metal.

8. The lithium battery as claimed in claim 1, wherein the lithium mixed metal oxide positive electrode further comprises a polymer binder, and the polymer binder comprises: poly(vinyliden fluoride), styrene-butadiene rubber, polyamide, melamine resin, or combinations thereof.

9. The lithium battery as claimed in claim 1, wherein the separator comprises: polyethylene, polypropylene, or combinations thereof.

* * * * *